(12) United States Patent
Li (10) Patent No.: US 10,824,010 B2
(45) Date of Patent: Nov. 3, 2020

(54) BACKLIGHT MODULE AND DISPLAY APPARATUS

(71) Applicant: Huizhou China Star Optoelectronics Technology Co., Ltd., Huizhou (CN)

(72) Inventor: Quan Li, Huizhou (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 343 days.

(21) Appl. No.: 15/993,912

(22) Filed: May 31, 2018

(65) Prior Publication Data

US 2019/0271880 A1  Sep. 5, 2019

Related U.S. Application Data

(63) Continuation of application No. PCT/CN2018/079601, filed on Mar. 20, 2018.

(30) Foreign Application Priority Data

Mar. 5, 2018 (CN) .......................... 2018 1 0191057

(51) Int. Cl.
*F21V 21/00* (2006.01)
*G02F 1/13357* (2006.01)
*F21V 8/00* (2006.01)

(52) U.S. Cl.
CPC ..... *G02F 1/133606* (2013.01); *G02B 6/0025* (2013.01); *G02F 1/133608* (2013.01);
(Continued)

(58) Field of Classification Search
CPC ......... G02F 1/133605; G02F 1/133608; G02F 1/133611; G02F 2001/133607
(Continued)

(56) References Cited

U.S. PATENT DOCUMENTS 8,953,118 B2 * 2/2015 Nishimura ........ G02F 1/133606
349/62
9,360,705 B2 * 6/2016 Sung ................. G02F 1/133528
(Continued)

FOREIGN PATENT DOCUMENTS

CN 101324723 A 12/2008
CN 102444842 A 5/2012
(Continued)

OTHER PUBLICATIONS

First Office Action dated Feb. 3, 2020 for Chinese Application No. 201810191057.2, 8 pages.

*Primary Examiner* — Laura K Tso
(74) *Attorney, Agent, or Firm* — Brinks Gilson & Lione (57) ABSTRACT

The present disclosure provides a backlight module and a display apparatus. The backlight module of the present disclosure may connect at least one of the diffuser film, the lower anti-reflection film and the upper anti-reflection film with the middle frame so as to avoid the problems of drop-off or movement of the at least one of the diffuser film, the lower anti-reflection film and the upper anti-reflection film. Thus, the solidity and the stability of the at least one of the diffuser film, the lower anti-reflection film and the upper anti-reflection film may be improved. The problems of uneven light distribution due to drop-off and movement of the at least one of the diffuser film, the lower anti-reflection film and the upper anti-reflection film may be avoided.

19 Claims, 5 Drawing Sheets

(52) U.S. Cl.
CPC ............... *G02F 1/133611* (2013.01); *G02F 2001/133607* (2013.01)

(58) Field of Classification Search
USPC ...................................... 362/97.2, 97.3, 633
See application file for complete search history.

(56) References Cited

U.S. PATENT DOCUMENTS

| | | | |
|---|---|---|---|
| 2004/0207996 A1* | 10/2004 | Kao | ................ G02F 1/133604 362/633 |
| 2016/0341879 A1 | 11/2016 | Zhang | |
| 2017/0045671 A1 | 2/2017 | Zeng et al. | |
| 2018/0098399 A1* | 4/2018 | Takeshita | ................ F21V 13/12 |
| 2018/0101064 A1* | 4/2018 | Fan | ...................... G02F 1/1333 |

FOREIGN PATENT DOCUMENTS

| | | | |
|---|---|---|---|
| CN | 102508368 | A | 6/2012 |
| CN | 104599592 | A | 5/2015 |
| CN | 105301834 | A | 2/2016 |
| CN | 106773292 | A | 5/2017 |
| CN | 206270623 | U | 6/2017 |
| CN | 107219686 | A | 9/2017 |
| CN | 206708858 | U | 12/2017 |
| JP | 2006-185804 | A | 7/2006 |

* cited by examiner

BACKLIGHT MODULE AND DISPLAY APPARATUS

CROSS-REFERENCE TO RELATED APPLICATIONS

The present application is a continuation-application of International (PCT) Patent Application No. PCT/CN2018/079601, field on Mar. 20, 2018, which claims foreign priority of Chinese Patent Application No. 201810191057.2, field on Mar. 5, 2018 in the State Intellectual Property Office of China, the entire contents of which are hereby incorporated by reference.

TECHNICAL FIELD

The present disclosure generally relates to the display field, and in particular to a backlight module and a display apparatus.

BACKGROUND

The backlight module is one of the key components of liquid crystal display panel. It is a light source that provides uniformly distributed light. The backlight module generally includes a light guide plate and optical films disposed successively thereon for realizing its image displaying function. When disposed on the light guide plate, the optical films may easily drop off due to movement. Thus, quality problems such as uneven light distribution may occur.

SUMMARY

The present disclosure provides a backlight module and a display apparatus so as to solve the quality problems such as uneven light distribution caused by the drop-off or the movement of the optical films.

To solve the above-mentioned problem, a technical scheme adopted by the present disclosure is to provide a backlight module. The backlight module may include: a middle frame defining an open slot; a light guide plate; an optical-film assembling, comprising a diffuser film, a lower anti-reflection film and an upper anti-reflection film, wherein, the diffuser film, the lower anti-reflection film and the upper anti-reflection film are successively disposed on the light guide plate one on another along a direction away from the light guide plate, at least one of the diffuser film, the lower anti-reflection film and the upper anti-reflection film comprises a body portion and a first connection portion, the first connection portion is connected to the body portion, the body portion is configured to achieve an optical function of at least one of the diffuser film, the lower anti-reflection film and the upper anti-reflection film, the first connection portion is disposed in the open slot and connected to the middle frame; wherein, the open slot is divided into a first slot portion and a second slot portion obliquely connected together, the first connection portion comprises a first sub-connection portion and a second sub-connection portion, the first sub-connection is connected to the body portion, the first sub-connection portion and the second sub-connection portion are obliquely connected together, respectively disposed in the first slot portion and the second slot portion, and connected to the middle frame.

To solve the above-mentioned problem, another technical scheme adopted by the present disclosure is to provide a backlight module. The backlight module may include: a middle frame defining an open slot; an optical-film assembling, comprising a diffuser film, a lower anti-reflection film and an upper anti-reflection film successively disposed one on another, at least one of the diffuser film, the lower anti-reflection film and the upper anti-reflection film comprises a body portion and a first connection portion, the first connection portion is connected to the body portion, the body portion is configured to achieve an optical function of at least one of the diffuser film, the lower anti-reflection film and the upper anti-reflection film, the first connection portion is disposed in the open slot and connected to the middle frame.

To solve the above-mentioned problem, another technical scheme adopted by the present disclosure is to provide a display apparatus. The display apparatus may include: a display module and any one of the above mentioned backlight modules, wherein the display module is disposed on the optical-film assembling.

The backlight module provided by the present disclosure includes a middle frame and an optical-film assembling. The middle frame module defines an open slot. The optical-film assembling includes a diffuser film, a lower anti-reflection film and an upper anti-reflection film successively disposed one on another. At least one of the diffuser film, the lower anti-reflection film and the upper anti-reflection film includes a body portion and a first connection portion connected to the body portion. The body portion is configured to achieve the optical function of the at least one of the diffuser film, the lower anti-reflection film and the upper anti-reflection film. The first connection portion is disposed in the open slot and connected to the middle frame so as to connect the at least one of the diffuser film, the lower anti-reflection film and the upper anti-reflection film with the middle frame, and to avoid the problems of drop-off or movement of the at least one of the diffuser film, the lower anti-reflection film and the upper anti-reflection film. Thus, the solidity and the stability of the at least one of the diffuser film, the lower anti-reflection film and the upper anti-reflection film may be improved. The problems of uneven light distribution due to drop-off and movement of the at least one of the diffuser film, the lower anti-reflection film and the upper anti-reflection film may be avoided.

BRIEF DESCRIPTION OF THE DRAWINGS

In order to clearly explain the technical solutions in the embodiments of the present disclosure, the drawings used in the description of the embodiments will be briefly described below. Obviously, the drawings in the following description are merely some embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

Figure 1:
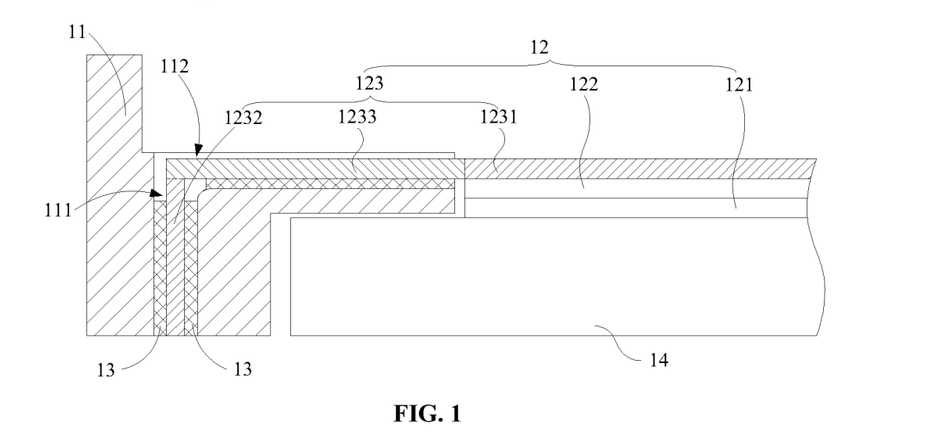
FIG. 1 is a schematic diagram of the backlight module according to an embodiment of the present disclosure.

Referring to FIG. 1, FIG. 1 is a schematic diagram of the backlight module 10 according to an embodiment of the present disclosure. In this embodiment, the backlight module 10 may include a middle frame 11 and an optical-film assembling 12.

Figure 2:
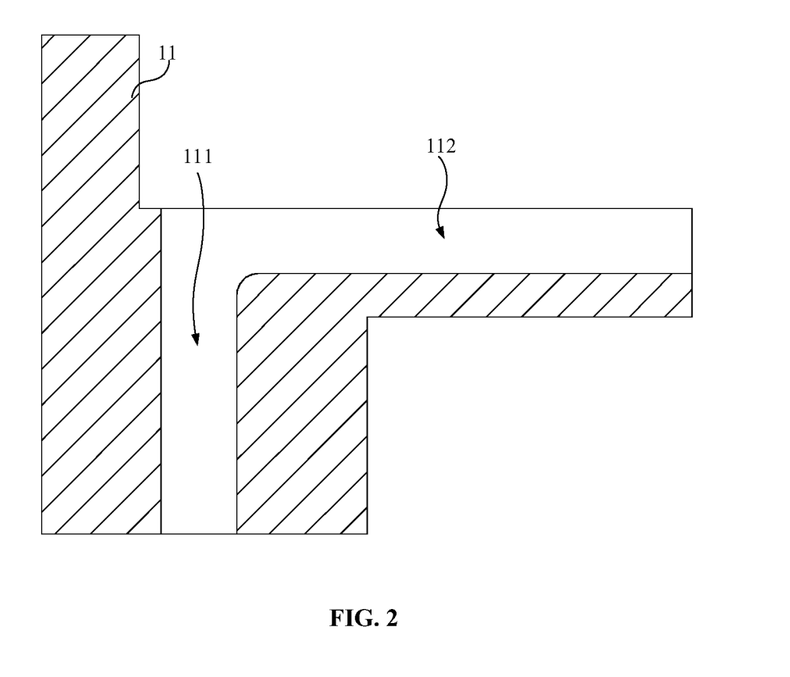
FIG. 2 is a section view of the middle frame of FIG. 1.

Please refer to FIG. 1 and FIG. 2 together. The middle frame 11 may define an open slot 111. The optical-film assembling 12 may include a diffuser film 121, a lower anti-reflection film 122 and an upper anti-reflection film 123 disposed successively one on another.

At least one of the diffuser film 121, the lower anti-reflection film 122 and the upper anti-reflection film 123 may include a body portion 1231 and a first connection portion 1232. The body portion 1231 may be configured to achieve the optical function of the at least one of the diffuser film 121, the lower anti-reflection film 122 and the upper anti-reflection film 123. The first connection portion 1232 may be connected to the body portion 1231, disposed in the open slot 111 and connected to the middle frame 11 so as to connect the at least one of the diffuser film 121, the lower anti-reflection film 122 and the upper anti-reflection film 123 with the middle frame 11, and to avoid the problems of drop-off or movement of the at least one of the diffuser film 121, the lower anti-reflection film 122 and the upper anti-reflection film 123. Thus, the solidity and the stability of the at least one of the diffuser film 121, the lower anti-reflection film 122 and the upper anti-reflection film 123 may be improved. The problems of uneven light distribution due to drop-off and movement of the at least one of the diffuser film 121, the lower anti-reflection film 122 and the upper anti-reflection film 123 may be avoided.

It should be understood, the upper anti-reflection film 123 as shown in the figure of this embodiment may include the body portion 1231 and the first connection portion 1232. In this case, the body portion 1231 may be configured to achieve the optical function of the upper anti-reflection film 123 itself. Similarly, when the diffuser film 121 and/or the lower anti-reflection film 122 include the body portion 1231 and the first connection portion 1232, the body portion 1231 may be configured to achieve the optical function of the diffuser film 121 and/or the lower anti-reflection film 122.

In one embodiment, the opening direction of the open slot 111 may be not parallel to the body portion 1231. For example, the opening direction of the open slot 111 may be perpendicular to the body portion 1231 as shown in FIG. 1. In this case, the first connection portion 1232 may extend from the body portion 1231 into the open slot 111, and be obliquely connected to the body portion 1231.

Figure 3:
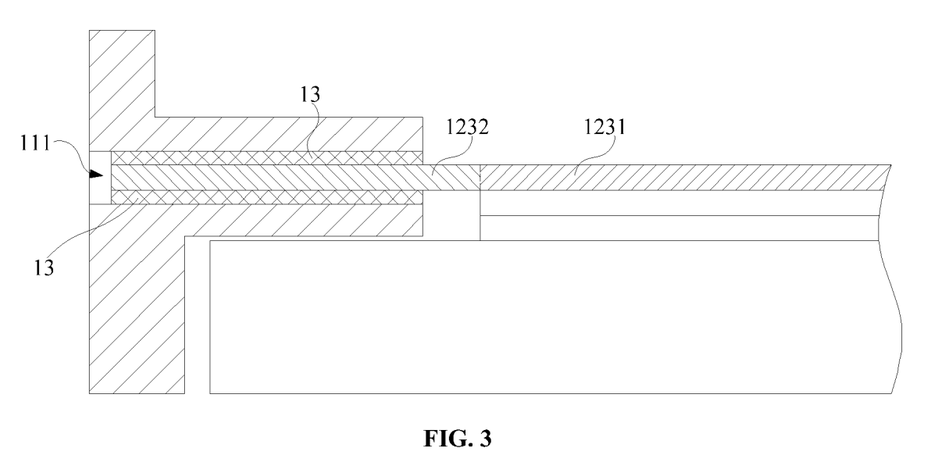
FIG. 3 shows a backlight module according to another embodiment of the present disclosure.

Referring to FIG. 3, in other embodiments, the opening direction of the open slot 111 may be parallel to the body portion 1231. In this case, the first connection portion 1232 may extend from the body portion 1231 into the open slot 111, and be disposed in a same plane as the body portion 1231.

Please refer to FIG. 1 and FIG. 3 together. Adhesive 13 may be arranged between the first connection portion 1232 and the middle frame 11. The first connection portion 1232 may be glued to the middle frame 11 by the adhesive 13.

In one embodiment, the adhesive 13 may include but not limited to hot melt adhesive or UV curing adhesive.

Figure 4:
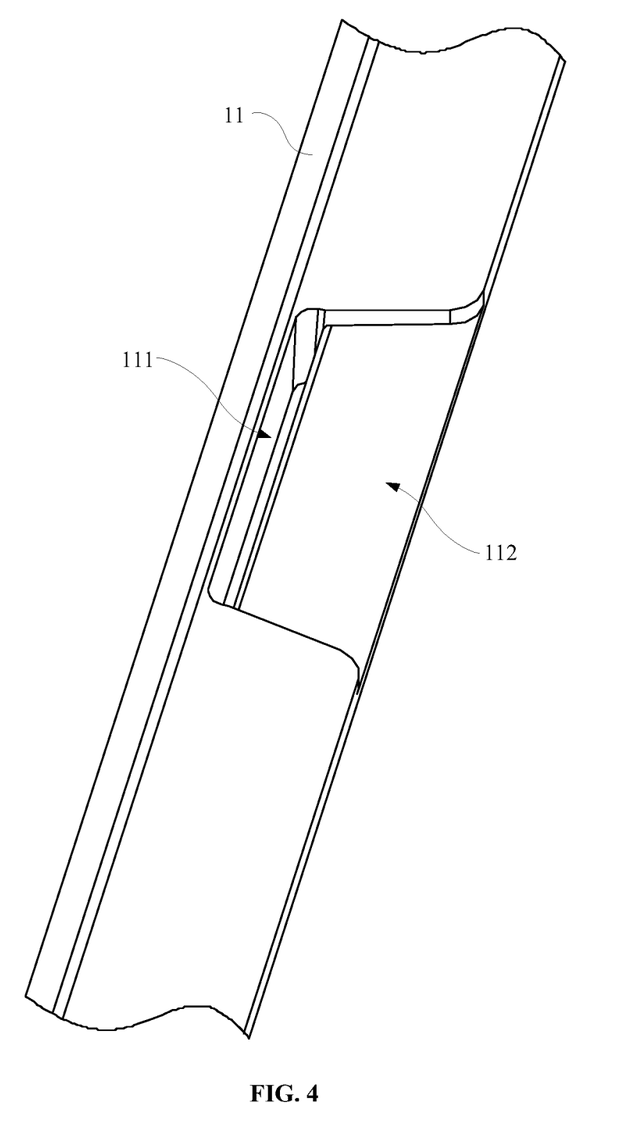
FIG. 4 is an isometric view of the middle frame of FIG. 1.

Please refer to FIG. 1, FIG. 2 and FIG. 4 together. The middle frame 11 may further define an opening 112. The opening 112 may communicate to the open slot 111 at a side close to the body portion 1231. The diffuser film 121, the at least one of the lower anti-reflection film 122 and the upper reflection film 123 may include a second connection portion 1233. The second connection portion 1233 may be connected to the body portion 1231 and the first connection portion 1232, and arranged in the opening 112.

The second connection portion 1233 may extend from the body portion 1231 into the opening 112. The second connection portion 1233 may be disposed in a same plane as the body portion 1231. The first connection portion 1232 may extend from the second connection portion 1233 into the open slot 111, and be obliquely connected to the second connection portion 1233.

In one embodiment, the second connection portion 1233 and the middle frame 11 may be glued together by, for example, hot melt adhesive or UV curving adhesive. Thus the solidity and the stability of the connection between the middle frame 11 and the at least one of the diffuser film 121, the lower anti-reflection film 122 and the upper anti-reflection film 123 may be further improved.

Moreover, the backlight module 10 of this embodiment may further include a light guide plate 14. The diffuser film 121, the lower anti-reflection film 122 and the upper anti-reflection film 123 may be successively disposed on the light guide plate 14 along a direction away from the light guide plate 14.

It should be understood, in this embodiment, when the upper anti-reflection film 123 at the top includes the body portion 1231 and the first connection portion 1232, on one hand, the solidity and the stability of the at least one of the diffuser film 121, the lower anti-reflection film 122 and the upper anti-reflection film 123 may be improved by the connection between the first connection portion 1232 and the middle frame 11, and on the other hand, the body portion 1231 of the upper anti-reflection film 123 may cover the lower anti-reflection film 122 and the diffuser film 121 and press them towards the light guide plate 14 so as to improve the solidity and the stability of the lower anti-reflection film 122 and the diffuser film 121.

Figure 5:
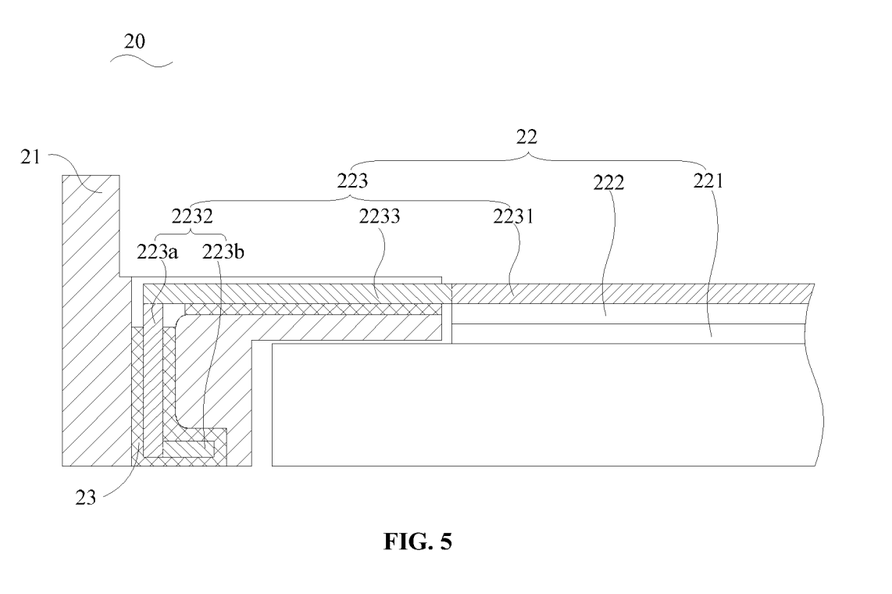
FIG. 5 is a schematic diagram of the backlight module according to another embodiment of the present disclosure.

Referring to FIG. 5, FIG. 5 is a schematic diagram of the backlight module 20 according to another embodiment of present disclosure. In this embodiment, the backlight module 20 may include a middle frame 21 and an optical-film assembling 22.

Figure 6:
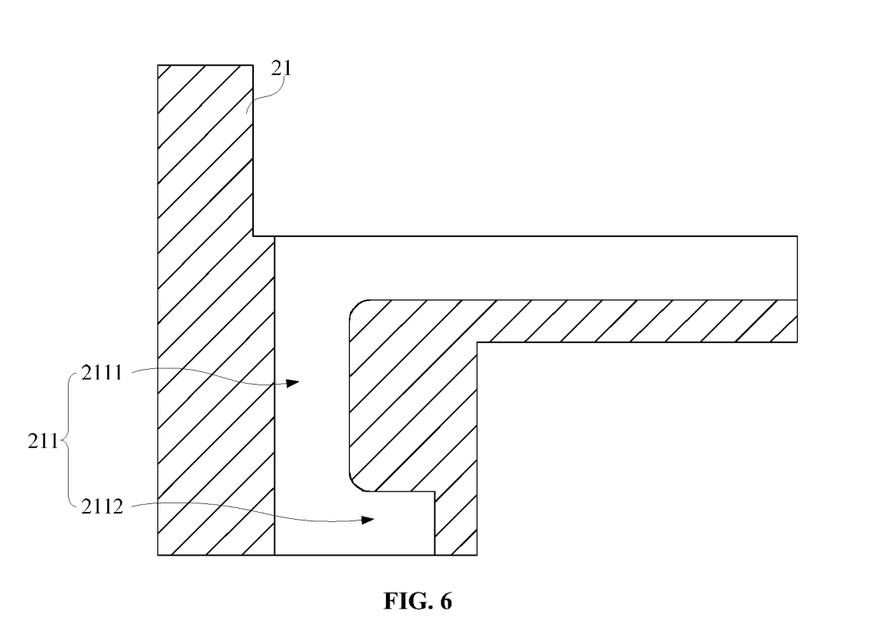
FIG. 6 is a section view of the middle frame of FIG. 5.

Please refer to FIG. 5 and FIG. 6 together. The middle frame 21 may define an open slot 211. The optical-film assembling 22 may include a diffuser film 221, a lower anti-reflection film 222 and an upper anti-reflection film 223 disposed successively one on another.

At least one of the diffuser film 221, the lower anti-reflection film 222 and the upper anti-reflection film 223 may include a body portion 2231 and a first connection portion 2232 and a second connection portion 2233. The second connection portion 2233 may be connected to the body portion 2231 and the first connection portion 2232. The second connection portion 2233 may be disposed in a same plane as the body portion 2231. The first connection portion 2232 may extend from the second connection portion 2233 into the open slot 211. The body portion 2231 may be configured to achieve the optical function of the at least one of the diffuser film 221, the lower anti-reflection film 222 and the upper anti-reflection film 223. The first connection portion 2232 may be connected to the body portion 2231, disposed in the open slot 211 and connected to the middle frame 21 so as to connect the at least one of the diffuser film 221, the lower anti-reflection film 222 and the upper anti-reflection film 223 with the middle frame 21, and to avoid the problems of drop-off or movement of the at least one of the diffuser film 221, the lower anti-reflection film 222 and the upper anti-reflection film 223. Thus, the solidity and the stability of the at least one of the diffuser film 221, the lower anti-reflection film 222 and the upper anti-reflection film 223 may be improved. The problems of uneven light distribution due to drop-off and movement of the at least one of the diffuser film 221, the lower anti-reflection film 222 and the upper anti-reflection film 223 may be avoided.

It should be understood, in the figure of this embodiment, the upper anti-reflection film 223 includes the body portion 2231 and the first connection portion 2232. In this case, the body portion 2231 is configured to achieve the optical function of the upper anti-reflection layer 223. Similarly, when the diffuser film 221 and/or the lower anti-reflection film 222 include the body portion 2231 and the first connection portion 2232, the body portion 2231 may be configured to achieve the optical function of the diffuser film 221 and/or the lower anti-reflection film 222.

Further, the open slot 211 may be divided into a first slot portion 2111 and a second slot portion 2112. The first connection portion 2232 may include a first sub-connection portion 223a and a second sub-connection portion 223b. The first sub-connection portion 223a may be connected to the body portion 2231. The first sub-connection portion 223a and the second connection portion 223b may be obliquely connected together, respectively disposed in the first slot portion 2111 and the second slot portion 2112 and connected to the middle frame 21.

In one embodiment, the open slot 211 may extend through the middle frame 21 and expose the second sub-connection portion 223b on the middle frame 21. It should be understood, since the open slot 211 includes a first slot portion 2111 and a second slot portion 2112 obliquely communicated, before the first connection portion 2232 is installed into the open slot 211, the first sub-connection portion 223a and the second sub-connection portion 223b need to be aligned in order to allow the second sub-connection portion 223b to be installed into the open slot 211 through the first slot portion 2111. Once the second sub-connection portion 223b is located in the second slot portion 2112, the second sub-connection portion 223b may be bent. Thus, in this embodiment, the open slot 211 may extend through the middle frame 21 and expose the second sub-connection portion 223b on the middle frame 21, which makes it very easy to bend the second sub-connection portion 223b and reduces installation difficulty.

In one embodiment, the opening direction of the open slot 211 may be not parallel to the body portion 2231. As shown in FIG. 5, the opening direction of the open slot 211 may be perpendicular to the body portion 2231. In this case, the first connection portion 2232 may extend to the open slot 211 from the body portion 2231, and obliquely connected to the body portion 2231.

Figure 7:
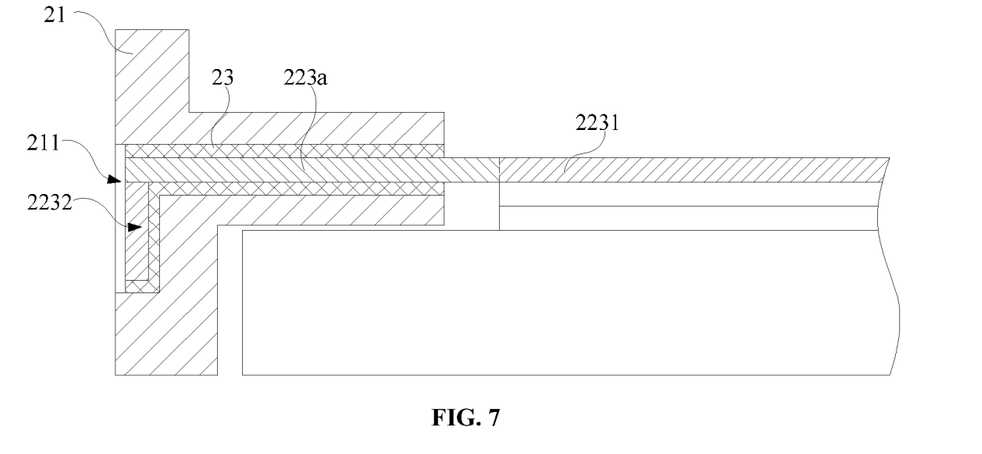
FIG. 7 shows a backlight module according to another embodiment of the present disclosure.

Referring to FIG. 7, in another embodiment, the opening direction of the open slot 211 may be parallel to the body portion 2231. In this case, the first connection portion 2232 may extend from the body portion 2231 into the open slot 211, and the first sub-connection portion 223a may be disposed at a same plane as the body portion 2231.

Referring also to FIG. 5 and FIG. 7, adhesive 23 may be arranged between the first connection portion 2232 and the middle frame 21. The first connection portion 2232 may be glued to the middle frame 21 by the adhesive 23.

Optionally, the adhesive 23 may include but not limited to hot melt adhesive or UV curving adhesive.

Other components of this embodiment may be same as those of the former embodiment. The detail of these components will not be discussed hereon for brevity.

Figure 8:
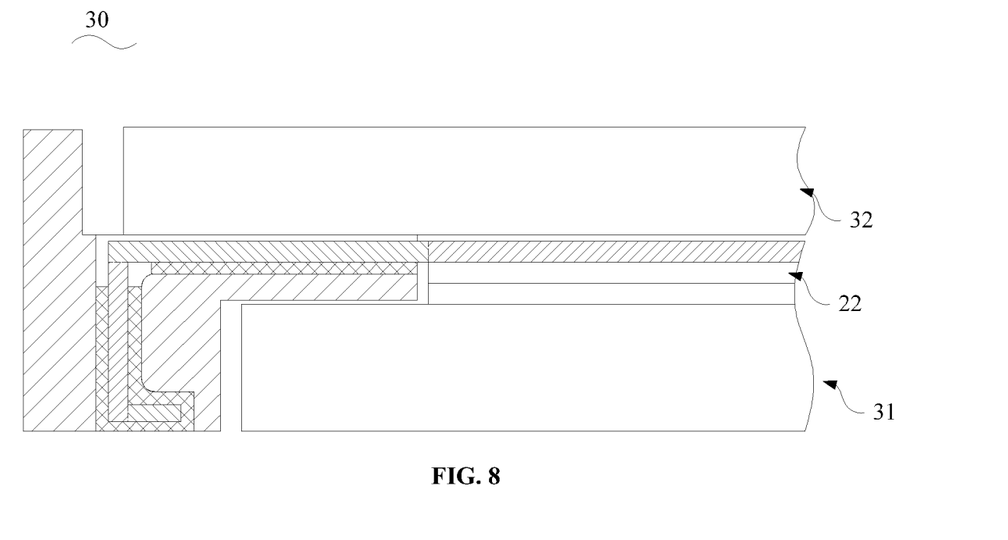
FIG. 8 is a schematic diagram of the display apparatus according to an embodiment of the present disclosure.

Referring to FIG. 8, FIG. 8 is a schematic diagram of the display apparatus 30 according to an embodiment of the present disclosure. In this embodiment, the display apparatus 30 may include a backlight module 31 and a display module 32.

The backlight module 31 may be any one of the backlight modules of foregoing embodiments, for example, the backlight module 20. The display module 32 is disposed on the optical-film assembling 22 of the backlight module 20.

The backlight module provided by the present disclosure includes a middle frame and an optical-film assembling. The middle frame module defines an open slot. The optical-film assembling includes a diffuser film, a lower anti-reflection film and an upper anti-reflection film successively disposed one on another. At least one of the diffuser film, the lower anti-reflection film and the upper anti-reflection film includes a body portion and a first connection portion connected to the body portion. The body portion is configured to achieve the optical function of at least one of the diffuser film, the lower anti-reflection film and the upper anti-reflection film. The first connection portion is disposed in the open slot and connected to the middle frame so as to connect the at least one of the diffuser film, the lower anti-reflection film and the upper anti-reflection film with the middle frame, and to avoid the problems of drop-off or movement of the at least one of the diffuser film, the lower anti-reflection film and the upper anti-reflection film. Thus, the solidity and the stability of the at least one of the diffuser film, the lower anti-reflection film and the upper anti-reflection film may be improved. The problems of uneven light distribution due to drop-off and movement of the at least one of the diffuser film, the lower anti-reflection film and the upper anti-reflection film may be avoided.

Referring to FIGS. 1-8, the backlight module of the present disclosure may include a frame (11 or 21), a light guide plate (14 or 31) disposed inside the frame and an optical-film assembling (12 or 22) disposed on the light guide plate (14 or 31). The frame (11 or 21) may define a first slot (111 or 2111). An end of the optical-film assembling (12 or 22) may be engaged in the first slot (111 or 2111) such that the optical-film assembling (12 or 22) is connected to the frame (11 or 21).

In one embodiment, the frame (21) may define a second slot (2112) communicated with the first slot (2111), and the second slot (2112) may be substantially perpendicular to the first slot (2111). The end of the optical-film assembling (22) may be engaged in the first slot (2111) and the second slot (2112) so as to hook the frame (21). For example, the end of the optical-film assembling (22) may be engaged in the first slot (2111) and the second slot (2112) by adhesive.

In one embodiment, the first slot (2111) is opened on a first side of the frame (21) while the second slot (2112) is opened on a second side of the frame (21), and the second side is opposite to the first side.

In one embodiment, the depth direction of the first slot (111) may be substantially parallel to the light guide plate (14) as shown in FIG. 3. In another embodiment, the depth direction of the first slot (111) may be substantially perpendicular to the light guide plate (14) as shown in FIG. 1.

In one embodiment, the frame may further define a chamber on the first side, as shown in FIG. 4. The chamber is communicated with the first slot, and an opening of the chamber is larger than an opening of the first slot. The end of the optical-film assembling may include a first connection portion and a second connection portion. The first connection portion may be substantially perpendicular to the second connection portion. The second connection portion may be contained in the chamber and supported by a bottom surface of the chamber. The first connection portion may extend from the second connection portion into the first slot and the second slot.

In one embodiment, the optical-film assembling may include a diffuser film, a lower anti-reflection film and an upper anti-reflection film successively disposed on the light guide plate. Optionally, an end of the upper anti-reflection film is engaged in the first slot. It should be understood that, in some embodiments, all of the ends of the upper anti-reflection film, the lower anti-reflection film and the diffuser film may be engaged in the first slot.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A backlight module, comprising:
a middle frame, having an open slot formed therein;
an optical-film group, comprising a diffuser film, a lower anti-reflection film and an upper anti-reflection film successively deposed layer-by-layer, wherein at least one of the diffuser film, the lower anti-reflection film and the upper anti-reflection film comprises a body portion and a first connection portion, the first connection portion is connected to the body portion, the body portion is configured to achieve an optical function of at least one of the diffuser film, the lower anti-reflection film and the upper anti-reflection film, and the first connection portion is disposed in the open slot and connected to the middle frame.

2. The backlight module of claim 1, wherein the open slot is divided into a first slot portion and a second slot portion obliquely communicated with each other, the first connection portion comprises a first sub-connection portion and a second sub-connection portion, the first sub-connection is connected to the body portion, the first sub-connection portion and the second sub-connection portion are obliquely connected together, respectively disposed in the first slot portion and the second slot portion, and connected to the middle frame.

3. The backlight module of claim 1, wherein adhesive is disposed between the first connection portion and the middle frame, and the first connection portion is glued to the middle frame by the adhesive.

4. The backlight module of claim 1, wherein an opening direction of the open slot is substantially perpendicular to the body portion, the first connection portion extends from the body portion into the open slot and is obliquely connected to the body portion.

5. The backlight module of claim 1, wherein an opening direction of the open slot is parallel to the body portion.

6. The backlight module of claim 4, wherein the middle frame further has an opening formed therein, the opening is communicated with the open slot and located at a side close to the body portion, at least one of the diffuser film, the lower anti-reflection film and the upper anti-reflection film further comprises a second connection portion connected to the body portion and the first connection portion, and the second connection portion is disposed in the opening.

7. The backlight module of claim 6, wherein, the second connection portion is disposed in a same plane as the body portion, the first connection portion and the second connection portion are obliquely connected together.

8. The backlight module of claim 2, wherein the open slot extends through the middle frame so as to expose the second sub-connection portion out of the middle frame.

9. The backlight module of claim 1, further comprising a light guide plate, wherein the diffuser film, the lower anti-reflection film and the upper anti-reflection film are successively disposed on the light guide plate one by one along a direction away from the light guide plate.

10. A display apparatus, comprising a display module and the backlight module of claim 1, wherein the display module is disposed on the optical-film group.

11. A backlight module, comprising:
a middle frame, having a first slot formed therein;
a light guide plate, disposed inside the middle frame;
an optical-film group, disposed on the light guide plate, wherein an end of the optical-film group is engaged in the first slot.

12. The backlight module of claim 11, wherein
the middle frame further has a second slot formed therein, the second slot is communicated with the first slot, and an extending direction of the second slot is substantially perpendicular to that of the first slot;
the end of the optical-film group is engaged in the first slot and the second slot so as to hook the middle frame.

13. The backlight module of claim 12, wherein
the end of the optical-film group is engaged in the first slot and the second slot by adhesive.

14. The backlight module of claim 12, wherein
the first slot is formed at a first side of the middle frame; and
the second slot is formed at a second side of the middle frame, wherein the second side is opposite to the first side.

15. The backlight module of claim 14, wherein
the extending direction of the first slot is substantially parallel to an extending direction the light guide plate.

16. The backlight module of claim 14, wherein
the extending direction of the first slot is substantially perpendicular to an extending direction the light guide plate.

17. The backlight module of claim 16, wherein
the middle frame further comprises a chamber adjacent to the first side thereof, the chamber is communicated with the first slot, and an opening of the chamber is larger than an opening of the first slot;
the end of the optical-film group comprises a first connection portion and a second connection portion, wherein, the second connection portion is contained in the chamber and supported by a bottom surface of the chamber, the first connection portion extends from the second connection portion into the first slot and the second slot.

18. The backlight module of claim 11, wherein
the optical-film group comprises a plurality of films, wherein one of the plurality of films at a top of the optical-film group has an end engaged in the first slot.

19. The backlight module of claim 18, wherein
the optical-film group comprises a diffuser film, a lower anti-reflection film and an upper anti-reflection film successively disposed on the light guide plate
an end of the upper anti-reflection film is engaged in the first slot.

* * * * *